US012126362B2

(12) United States Patent
Grossman et al.

(10) Patent No.: US 12,126,362 B2
(45) Date of Patent: Oct. 22, 2024

(54) ERROR CORRECTING CODES FOR NOISY CHANNELS

(71) Applicant: NTT Research, Inc., Sunnyvale, CA (US)

(72) Inventors: Ofer Grossman, Cambridge, MA (US); Justin Holmgren, Cambridge, MA (US); Eylon Yogev, Tel Aviv (IL)

(73) Assignees: NTT Research, Inc., Sunnyvale, CA (US); Ramot at Tel Aviv University LTD, Tel Aviv (IL)

( * ) Notice: Subject to any disclaimer, the term of this patent is extended or adjusted under 35 U.S.C. 154(b) by 22 days.

(21) Appl. No.: 18/029,328

(22) PCT Filed: Sep. 28, 2021

(86) PCT No.: PCT/US2021/052447
§ 371 (c)(1),
(2) Date: Mar. 29, 2023

(87) PCT Pub. No.: WO2022/072368
PCT Pub. Date: Apr. 7, 2022

(65) Prior Publication Data
US 2023/0370093 A1 Nov. 16, 2023

Related U.S. Application Data

(60) Provisional application No. 63/085,132, filed on Sep. 29, 2020.

(51) Int. Cl.
H03M 13/19 (2006.01)
H04L 9/40 (2022.01)

(52) U.S. Cl.
CPC ........ *H03M 13/19* (2013.01); *H04L 63/0428* (2013.01)

(58) Field of Classification Search
CPC ...... H03M 13/19; H04L 1/08; H04L 63/0428; H04L 25/03; G06F 21/64
See application file for complete search history.

(56) References Cited

U.S. PATENT DOCUMENTS

| 2014/0074719 | A1  | 3/2014 | Gressel et al. |
| 2015/0003557 | A1* | 1/2015 | Perry ........................ H04L 1/08 375/285 |
| 2016/0085955 | A1  | 3/2016 | Lerner |
| 2018/0247386 | A1  | 8/2018 | Zheng et al. |

(Continued)

OTHER PUBLICATIONS

David M Benton, Concurrent codes: A holographic-type encoding robust against noise and loss, PLoS ONE 11.3, (retrieved from Dialog), pp. 1 to 14. (Year: 2016).*

(Continued)

*Primary Examiner* — Shelly A Chase
(74) *Attorney, Agent, or Firm* — CipherLaw

(57) ABSTRACT

The invention relates to systems, methods, network devices, and machine-readable media for encoding an input message with robustness against noise by executing a compressing hash function on the input message, encoding an output of the hash function and the input message to generate a single combined message, executing a permutation function on the combined message, and encoding the result of the permutation function with a list-decodable code.

19 Claims, 4 Drawing Sheets

(56) References Cited

U.S. PATENT DOCUMENTS

2020/0145493 A1    5/2020   Wang et al.
2020/0287898 A1    9/2020   Weaver et al.

OTHER PUBLICATIONS

Ayoob et al., Improving system reliability by Joint Usage of Hash function bits and error correction coding, IEEE, pp. 1 to 6. (Year: 2015).*

Schaefer et al., List decoding for arbitrarily varying broadcast channels with receiver side information, IEE, Trans. on. Info. Theory, vol. 60, No. 8, pp. 4472 to 4487. (Year: 2014).*

Elwyn R. Berlekamp, "The Technology of Error-Correcting Codes", May 1980, pp. 564-593., vol. 68-5, IEEE, Retrieved from the internet <URL: https://ieeexplore.ieee.org/stamp/stamp.jsp? tp=&arnumber=1455965> entire document.

International Search Report and Written Opinion of the International Searching Authority in relation to International Application No. PCT/US2021/052447, dated Feb. 14, 2022, 10 pages.

* cited by examiner

ERROR CORRECTING CODES FOR NOISY CHANNELS

CROSS-REFERENCE TO RELATED APPLICATIONS

This application is a national stage application, filed under 35 U.S.C. § 371, of International Patent Application No. PCT/US2021/052447, filed Sep. 28, 2021, which claims the benefit of U.S. Provisional Application No. 63/085,132 filed Sep. 29, 2020, the contents of both of which are hereby incorporated in their entireties.

FIELD OF THE INVENTION

The present disclosure relates to uniquely decodable error correcting codes against channels which have computationally bounded noise, in particular relying on a public-coin (transparent) setup and a cryptographic hash function.

BACKGROUND OF THE INVENTION

Error correcting codes (ECCs) are a tool for handling errors when transmitting messages over an unreliable communication channel. They work by first encoding the message with additional redundant information, which is then sent over the channel. This allows the recipient to recover the original encoded message, even in the presence of a limited number of errors that might occur during transmission.

Since their introduction in the 1950s, error correcting codes have been a thriving research area due to their role both in practical applications and in theoretical computer science. One of the central open questions concerns the exact tradeoff between a code's rate (message length divided by codeword length) and the code's error tolerance (the number of errors that its decoding algorithm can tolerate). There are several known fundamental bounds (e.g. the Hamming, Singleton, and Plotkin bounds) on the maximum rate of a code in terms of its distance, and state of the art codes (especially over small alphabets) often only achieve significantly lower rates.

To achieve better rates, two major relaxations of error correction have been proposed. In the first, called list decoding, a decoding algorithm is no longer required to output the originally encoded message, but may instead output a short list of messages which is required to contain the original message. In the second relaxation, the communication channel between the sender and receiver is assumed to be restricted in some way. In other words, the code is no longer required to handle fully worst-case errors. The most relevant model for us is the computationally bounded channel, which loosely speaking, models codeword errors as generated by a polynomial-time process.

Known solutions construct codes for the computationally bounded channel with better rates than are achievable by codes for worst-case errors, but their codes require a trusted setup. Specifically, the encoding algorithms for their codes and also the decoding algorithm require a secret key that, if leaked, allows an efficient channel to thwart the decoding algorithm with a relatively small number of corruptions. Secret randomness is much more difficult to instantiate than public randomness (also known as transparent). Thus there is a need for effeciently usable uniquely decodable codes for the computationally bounded channel with transparent setup.

An additional drawback of known constructions is that they require a stateful encoder, which may render them unsuitable for use in data storage or in applications requiring concurrent transmission of multiple messages. In one known solution, it is essential for security that the encoder's state never repeats, and essential for correctness that the decoder's state is synchronized with the encoder's state. In another known solution, the decoder is stateless, but it is essential for security that errors are chosen in an online fashion. In other words, there are no guarantees if a codeword c is corrupted after seeing a codeword c' that was encoded after c. This exemplifies the undesirable dependence, induced by the encoder's statefulness, of the code's error tolerance on the precise environment in which it is used. Thus, there is also a need for efficiently usable uniquely decodable codes for the computationally bounded channel with a stateless encoder.

BRIEF SUMMARY OF THE INVENTION

Some embodiments of the invention include systems and methods for encoding messages with robustness against noise, comprising receiving an input message; storing the input message in a computerized data store; executing a compressing hash function on the input message to generate an output; encoding the output of the hash function and the input message to generate a single combined message; executing a permutation function on the combined message to generate a result; encoding the result of the permutation function with a list-decodable code; and storing the encoded result in the computerized data store.

In some further embodiments, the compressing hash function is a cryptographic hash function with an output that is smaller in bit length than the input message; and when the encoding function to generate a single combined message is applied separately to two uniformly random strings, each string of the same length as the combined message, the resulting outputs are far in Hamming distance from each other with high probability.

In some further embodiments, the single combined message is a concatenation of the input message and the output of the compressing hash function.

In some further embodiments, the permutation function has the properties of k-wise delta-dependence, where k is an integer selected based on its size and delta is a real number, and wherein the permutation function has an efficient inversion algorithm.

In some further embodiments, the list-decidable code has the property of being efficiently p-list decidable, such that there exists an efficient algorithm that takes as input any noisy encoded message in which at most a p fraction of the symbols of the encoded message have been affected by noise, and outputs a list of possible messages that includes the input message, wherein p is a real number between 0 and 1.

Some further embodiments comprise transmitting the encoded result in a communication channel, wherein the communication channel is wired or wireless, and wherein the computerized data store is a solid-state drive or a hard drive.

Some further embodiments comprise reading the encoded result from the computerized data store; and transmitting the encoded result in a wireless broadcast communication channel to a plurality of recipients.

Some embodiments of the invention include systems and methods for decoding a codeword which may have been corrupted by noise, comprising receiving a potentially noisy encoding of an original message; computing a list of strings by using a list-decoding algorithm applied to the potentially noisy encoding of the original message; for each string in the list, applying a permutation function, resulting in a new list of permuted strings; for each permuted string, parsing it as a pair comprising a message and a hash value, resulting in a list of message-hash value pairs; from among the list of message-hash value pairs, selecting all pairs in which the hash value is equal to a result of applying a cryptographic hash function to the original message; if there are no pairs in the selection, then output that the codeword had uncorrectable noise; and if and only if there is at least one pair remaining, output the message component of the pair whose encoding is determined to be closest to the received potentially noisy encoding in Hamming distance.

In some further embodiments, the permutation function is configured to be the inverse of a permutation function that has the properties of k-wise delta-dependence, where k is an integer selected based on its size and delta is a real number, and wherein the permutation function has an efficient inversion algorithm.

In some further embodiments, the list-decoding algorithm is configured to enumerate a list of all possible message-hash value pairs whose encoding is p-close in relative Hamming distance to the received potentially noisy encoding, where p is a real number between 0 and 1.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

Figure 1:
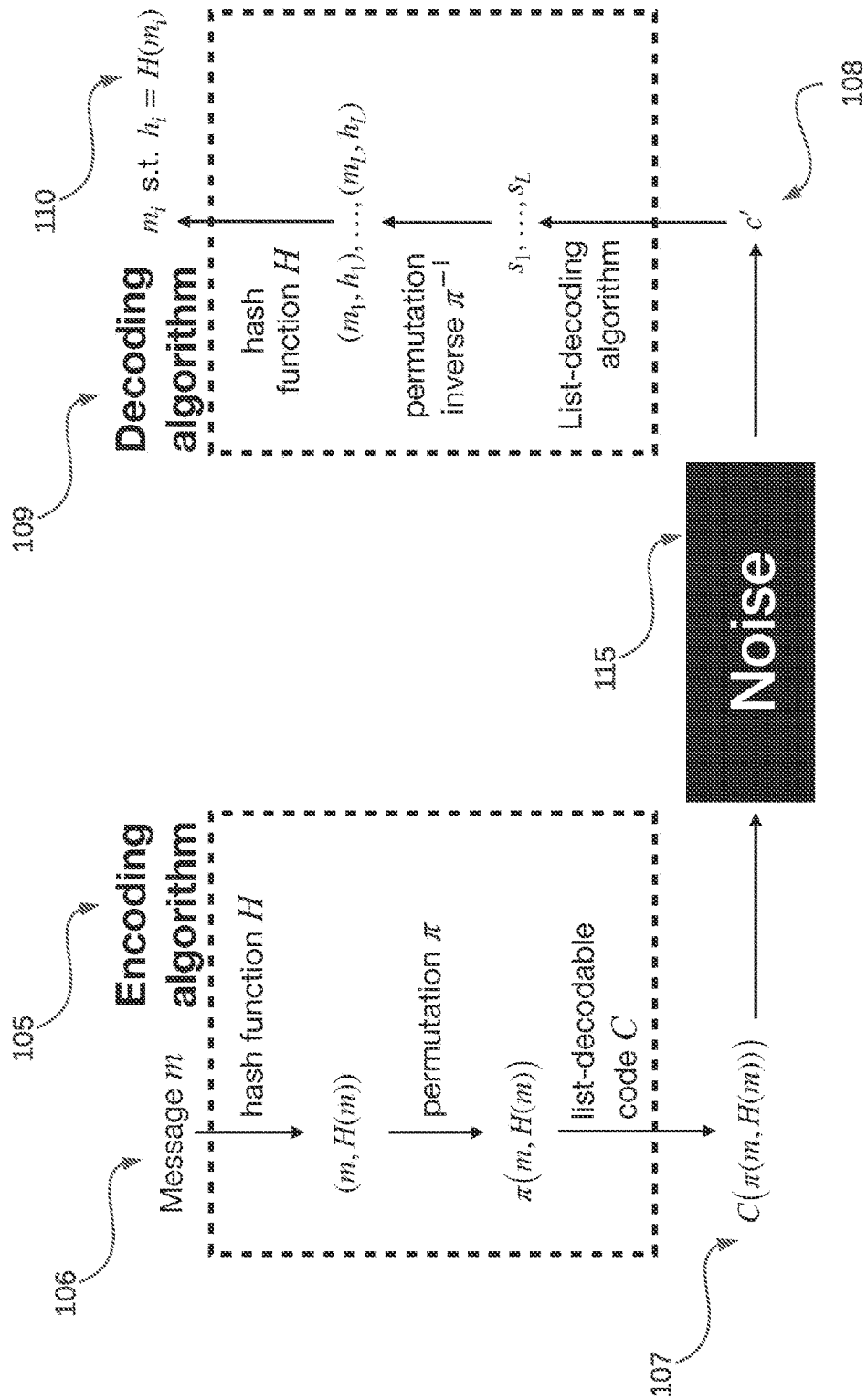
FIG. 1 illustrates an example algorithm for encoding and decoding against noise.

Disclosed herein are efficiently usable uniquely decodable codes for the computationally bounded channel with transparent setup, and efficiently usable uniquely decodable codes for the computationally bounded channel with a stateless encoder.

We construct a code for computationally bounded channels (with transparent setup and stateless encoding) that outperforms codes for worst-case errors. As a contribution that may be of independent interest, we also construct codes with high pseudodistance, i.e., codes for which it is hard to find two codewords that are close in Hamming distance.

Pseudounique Decoding

The main goal of an error correcting code C is to facilitate the recovery of a transmitted message given a partially corrupted copy of C(m). To formalize this (in the information-theoretic setting), a polynomial-time algorithm D is said to be a unique decoding algorithm for C against ρ errors if for all messages m and all strings c' that are ρ-close in Hamming distance to C(m), we have D(c')=m.

In reality, messages and noise are created by nature, which can be conservatively modeled as a computationally bounded adversary. We thus relax the above for all quantification and only require efficient decoding when both m and c' are chosen by a computationally bounded process. Our codes will be described by randomly generated seed that is used in the encoding and decoding procedures. In other words, we will work with a seeded family of codes $\{C_{pp}\}$, where pp is the seed, which we will also refer to as the public parameters for the code. In our constructions, the public parameters are merely unstructured uniformly random strings of a certain length.

More formally, we say that a polynomial-time algorithm D is a pseudounique decoding algorithm for $\{C_{pp}\}$ against ρ errors if no polynomial-time adversary A can win the following game with noticeable probability. The public parameters pp are first sampled uniformly at random and given to A. The adversary then produces a message m and a string c', and is said to win if c' is ρ-close to $C_{pp}(m)$ and D(pp, c')≠m.

Under cryptographic assumptions (or in the random oracle model), we construct codes with pseudounique decoding algorithms for a larger fraction of errors than is possible in the standard setting. The systems and methods can be configured to employ an efficiently usable cryptographic hash function (which is used as a black box). It is a multi-input generalization of correlation intractability, that can be instantiated by a (non-programmable) random oracle.

Informal Theorem 1.1 For any r∈(0,1) and any $$\rho < \min\left(1-r, \frac{1}{2}\right)$$

there exist rate-r codes, over large (polynomial-sized) alphabets, that are efficiently pseudouniquely decodable against up to a ρ fraction of errors, assuming good hash functions exist (or in the random oracle model).

This should be contrasted with the Singleton bound, which rules out (standard) unique decoding for more than $$\min\left(\frac{1-r}{2}, \frac{1}{2}\right)$$

errors. Our positive result is a corollary of a more general connection to efficient list-decodability. This connection also implies results over binary alphabets, albeit with bounds that are harder to state because known binary codes do not achieve list-decoding capacity and instead have messy rate vs. error correction tradeoffs.

Pseudodistance

Our second notion is an analogue of distance. Recall that a code C is said to have distance d if for all pairs of distinct messages $m_0$, $m_1$, their encodings $C(m_0)$ and $C(m_1)$ have Hamming distance d. We can similarly replace this for all quantifier and only require $C_{pp}(m_0)$ and $C_{pp}(m_1)$ to be far for pairs $m_0$, $m_1$ that are computed from pp by a computationally bounded adversary.

We note that a code's pseudodistance may be arbitrarily high without implying anything about its decodability, even by an inefficient algorithm. It is instructive to imagine a rate-1 code whose encoding algorithm is given by a (sufficiently obfuscated) random permutation mapping $\{0,1\}^n \rightarrow \{0,1\}^n$. The pseudodistance of this code will be roughly n/2, but it is information theoretically impossible to decode in the presence of even a single error.

Main Definitions and Main Theorem Statement

The preceding is formalized in the following definitions as used herein.

Definition 1.2 A seeded code with alphabet size $q(\cdot)$ is a pair C=(Setup, Enc) of polynomial-time algorithms with the following syntax:

Setup is probabilistic, takes a domain length $k \in \mathbb{Z}^+$ (in unary), and outputs public parameters pp.

Enc is deterministic, takes parameters pp and a message $m \in \{0,1\}^k$, and outputs a codeword $c \in [q(k)]^{n(k)}$, where $n(\cdot)$ is called the length of C.

When $$\lim_{k \to \infty} \frac{k}{n(k)\log_2 q(k)} \in [0, 1]$$

is well-defined it is called the rate of C. If Setup simply outputs a uniformly random binary string of some length that depends on k, then we say that C is public-coin.

Definition 1.3 A seeded code C=(Setup, Enc) is said to have $(s(\cdot), \epsilon(\cdot))$ pseudodistance $d(\cdot)$, if for all size-$s(\cdot)$ circuit ensembles $\{A_k\}_{k \in \mathbb{Z}^+}$ we have $$\Pr_{\substack{pp \leftarrow Setup(1^k) \\ (m_0, m_1) \leftarrow A_k(pp)}} [\Delta(Enc(pp, m_0), Enc(pp, m_1)) < d] \le \epsilon(k),$$

where $\Delta(\cdot,\cdot)$ denotes the (absolute) Hamming distance.

C is said simply to have pseudodistance $d(\cdot)$ if for all $s(k) \le k^{O(1)}$, there exists $\epsilon(k) \le k^{-\omega(1)}$ (1) such that C has $(s, \epsilon)$-pseudodistance d.

Definition 1.4 An algorithm Dec is said to be an $(s(\cdot), \epsilon(\cdot))$ pseudounique decoder for C=(Setup, Enc) against $d(\cdot)$ errors if for all size-$s(\cdot)$ circuit ensembles $\{A_k\}_{k \in \mathbb{Z}^+}$ $$\Pr_{\substack{pp \leftarrow Setup(1^k) \\ (m,c) \leftarrow A_k(pp)}} [\Delta(c, Enc(pp, m)) \le d(k) \wedge Dec(pp, c) \ne m] \le \epsilon(k).$$

We say that C efficiently $(s(\cdot), \epsilon(\cdot))$ pseudouniquely decodable against $d(\cdot)$ errors if there is a polynomial-time algorithm Dec that is an $(s(\cdot), \epsilon(\cdot))$-pseudounique decoder for C. We omit s and $\epsilon$ in usage of the above definitions when for all $s(k) \le k^{O(1)}$, there exists $\epsilon(k) \le k^{-\omega(1)}$ such that the definition is satisfied.

We refer to a "$\rho$ fraction of errors" to refer to some $d(k)$ such that $$\lim_{k \to \infty} \frac{d(k)}{n(k)} = \rho,$$

where $n(\cdot)$ is the length of C.

As in the previous theorem, we assume the existence of random-like hash functions to obtain our result. These hash functions can be instantiated in the random oracle model.

Informal Theorem 1.5 If $\{C: \{0,1\}^k \to [q]^{n_k}\}$ is a rate-r ensemble of codes that is efficiently list-decodable against a $\rho$ fraction of errors, and if good hash functions exist, then there exists a rate-r seeded code that is efficiently pseudouniquely decodable against a $$\min\left(\rho, \frac{H_q^{-1}(r + H_q(\rho))}{2}\right)$$

fraction of errors.

The above bound has a nice interpretation when C approaches capacity, i.e. when $r + H_q(\rho) \approx 1$. Then $$\frac{H_q^{-1}(r + H_q(\rho))}{2} \approx \frac{1}{2} \cdot \left(1 - \frac{1}{q}\right),$$

which is the best possible unique-decoding radius for any positive-rate q-ary code. So if C achieves capacity, one can uniquely decode up to the list-decoding radius of C, as long as that doesn't exceed $$\frac{1}{2} \cdot \left(1 - \frac{1}{q}\right).$$

Combinatorics

Definition 2.1 The $i^{th}$ falling factorial of $n \in \mathbb{R}$ is $(n)_i \stackrel{def}{=} n \cdot (n-1) \ldots (n-i+1)$.

Definition 2.2 The q-ary entropy function $H_q: [0,1] \to [0,1]$ is defined as $$H_q(x) \stackrel{def}{=} x\log_q(q-1) - x\log_q x - (1-x)\log_q(1-x).$$

We write $H_\infty(x)$ to denote $\lim_{q \to \infty} H_q(x)$, which is equal to x. If we write H(x), omitting the subscript, we mean $H_2(x)$ by default.

Definition 2.3 For any alphabet $\Sigma$, any n, and any u, $v \in \Sigma^n$, the Hamming distance between u and v, denoted $\Delta(u, v)$, is $$\Delta(u, v) \stackrel{def}{=} |\{i \in [n]: u_i \ne v_i\}|.$$

When $\Delta(u, v) \le \delta n$, we write $u \approx_\delta v$. If S is a set, we write $\Delta(u, S)$ to denote $\min_{v \in S} \Delta(u, v)$.

2.2 Codes

Definition 2.4 A deterministic q-ary code is a function C: $[K] \to [q]^n$, where n is called the block length of C, [K] is called the message space, and [q] is called the alphabet. The distance of C is the minimum Hamming distance between C(m) and C(m') for distinct m, m'$\in$ [K]. A probalistic q-ary code of block length n and message space [K] is a randomized function $$C: [K] \xrightarrow{\$} [q]^n.$$

When discussing the asymptotic performance of (deterministic or probabilistic) codes, it makes sense to consider ensembles of codes $\{C_i: [K_i] \to [q_i]^{n_i}\}$ with varying message spaces, block lengths, and alphabet sizes. We will assume several restrictions on $K_i$, $n_i$, and $q_i$ that rule out various pathologies. Specifically, we will assume that:

$K_i$, $q_i$, and $n_i$ increase weakly monotonically with i and are computable from i in polynomial time (i.e. in time polylog(i)).

$q_i$ is at most polylog($K_i$).

There is a polynomial-time algorithm E that given (i, x) for $x \in [K_i]$ outputs $C_i(x)$.

The $$\text{limit } r = \lim_{i \to \infty} \frac{\log K_i}{n_i \cdot \log q_i}$$

exists with $r \in (0,1)$. We call r the rate of the ensemble.

$$\limsup_{i \to \infty} \frac{\log K_{i+1}}{\log K_i} = 1.$$

This is important so that the cost of padding (to encode arbitrary-length messages) is insignificant.

One implication of these restrictions is that without loss of generality we can assume that $\{K_i\}_{i \in \mathbb{Z}^+} = \{2^k\}_{k \in \mathbb{Z}^+}$ and we can index our codes by k rather than by i.

Definition 2.5 We say that an ensemble of codes $\{C_k: \{0,1\}^k \to [q_k]^{n_k}\}_{k \in \mathbb{Z}^+}$ is combinatorially ρ-list decodable if for any $y \in [q_k]^{n_k}$, there are at most poly(k) values of $m \in \{0,1\}^k$ for which $C_k(m) \approx_\rho y$. If there is a polynomial-time algorithm that outputs all such m given y (and $1^k$), we say that $\{C_k\}$ is ρ-list decodable.

Pseudorandomness

Definition 2.6 Random variables $X_1, \ldots, X_n$ are said to be t-wise independent if for any set $S \subseteq [n]$ with size $|S|=t$, the random variables $\{X_i\}_{i \in S}$ are mutually independent.

Definition 2.7 Discrete random variables $X_1, \ldots, X_n$ are said to be t-wise β-dependent in Rényi ∞-divergence if for all sets $S \subseteq [n]$ of size $|S|=t$, it holds for all $(x_i)_{i \in S}$ that $$Pr\left[\bigwedge_{i \in S} X_i = x_i\right] \leq \beta \cdot \prod_{i \in S} Pr[X_i = x_i].$$

Permutations

If X is a finite set, we write $S_X$ to denote the set of all permutations of X.

Definition 2.8 A family of permutations $\Pi \subseteq S_X$ is said to be t-wise ε-dependent if for all distinct $x_1, \ldots, x_t \in X$, the distribution of $(\pi(x_1), \ldots, \pi(x_t))$ for uniformly random $\pi \leftarrow \Pi$ is ε-close in statistical distance to uniform on $\{(y_1, \ldots, y_t): y_1, \ldots, y_t \text{ are distinct.}\}$ To avoid pathological issues regarding the domains of permutation families (e.g. their sampleablity, decidability, and compressability), we will restrict our attention to permutations on sets of the form $\{0,1\}^k$ for $k \in \mathbb{Z}^+$.

Definition 2.9 We say that an ensemble $\{\Pi_k \subseteq S_{\{0,1\}^k}\}_{k \in \mathbb{Z}^+}$ of permutation families is fully explicit if there are poly(k)-time algorithms for:
- sampling a description of $\pi \leftarrow \Pi_k$; and
- computing $\pi(x)$ and $\pi^{-1}(x)$ given x and a description of $\pi \in \Pi_k$.

Imported Theorem 2.10 For any $t=t(k) \leq k^{O(1)}$, and any $\epsilon=\epsilon(k) \geq 2^{-k^{O(1)}}$, there is a fully explicit t-wise ε-dependent ensemble $\{\Pi_k \subseteq S_{\{0,1\}^k}\}_{k \in \mathbb{Z}^+}$ of permutation families.

The following non-standard variation on the notion of t-wise almost-independence will prove to be more convenient for us.

Definition 2.11 A probability distribution P is said to be β-close in Rényi ∞-divergence to a distribution Q if for all x, $P(x) \leq \beta \cdot Q(x)$.

Definition 2.12 We say that a family $\Pi \subseteq S_X$ is t-wise β-dependent in Rényi ∞-divergence if for all distinct $x_1, \ldots, x_t \in X$, the distribution of $(\pi(x_1), \ldots, \pi(x_t))$ is β-close in Rényi ∞-divergence to the uniform distribution on $X^t$.

It is easily verified that any family of permutations $\Pi \subseteq S_{[K]}$ that is t-wise ε-dependent as in Definition 2.8 is also t-wise β-dependent in Rényi ∞-divergence with $$\beta = \epsilon \cdot K^t + \frac{k^t}{(K)_t}.$$

Thus Imported Theorem 2.10 gives us the following.

Corollary 2.13 For any $t=t(k) \leq k^{O(1)}$, there is a fully explicit t-wise O(1)-dependent (in Rényi ∞-divergence) ensemble $\{\Pi_k \subseteq S_{\{0,1\}^k}\}_{k \in \mathbb{Z}^+}$ of permutation families.

Multi-Input Correlation Intractability

Correlation intractability is a way to model a large class of random oracle-like security properties of hash functions. H is said to be correlation intractable if for any sparse relation R it is hard to find x such that $(x, H(x)) \in R$.

For the applications described herein, we need a stronger multi-input variant of correlation intractability. We formulate a notion of multi-input sparsity such that a hash function can plausibly be correlation intractable for all sparse multi-input relations. Indeed, we prove that a random oracle has this property.

Definition 3.1 (Multi-Input Relations) For sets X and Y, an $\ell$-input relation on (X, Y) is a subset $R \subseteq X^\ell \times Y^\ell$.

We say that R is p-sparse if for all $i \in [\ell]$, all distinct $x_1, \ldots, x_\ell \in X$, and all $y_1, \ldots, y_{i-1}, y_{i+1}, \ldots, y_\ell \in Y$, we have $$\Pr_{y_i \leftarrow Y}[(x_1, \ldots, x_\ell, y_1, \ldots, y_\ell) \in R] \leq p.$$

An ensemble of $\ell$-input relations $\{R_\lambda\}_{\lambda \in \mathbb{Z}^+}$ is said simply to be sparse if there is a negligible function $p: \mathbb{Z}^+ \to \mathbb{R}$ such that each $R_\lambda$ is $p(\lambda)$-sparse.

Definition 3.3 (Multi-Input Correlation Intractability) An ensemble $H=\{H_\lambda\}_{\lambda \in \mathbb{Z}^+}$ of function families $H_\lambda = \{H_k: X_\lambda \to Y_\lambda\}_{k \in K_\lambda}$ is $\ell$-input $(s(\cdot), \epsilon(\cdot))$-correlation intratable for a relation ensemble $\{R_\lambda \subseteq X_\lambda^\ell \times Y_\lambda^\ell\}$ if for every size-$s(\lambda)$ adversary A:

$$\Pr_{\substack{k \leftarrow K_\lambda \\ (x_1, \ldots, x_\ell) \leftarrow A(k)}}[(x_1, \ldots, x_\ell, H_k(x_1), \ldots, H_k(x_\ell)) \in R_\lambda] \leq \epsilon(\lambda).$$

Construction

We have defined the notion of a multi-input correlation intractable hash, and showed that they can be constructed in the random oracle model. We now construct a seeded family of codes that is pseudouniquely decodable against a large fraction of errors, using 2-input correlation intractable hash functions as a central tool (in a black-box way). The construction starts with any efficiently list-decodable code C: $\{0,1\}^k \to [q]^n$, and modifies it in several steps.

1. First apply a decociability- and rate-preserving seeded transformation to C to obtain a (seeded family) of stochastic codes in which with all pairs of messages are mapped to far apart codewords with overwhelmingly probability.

Specifically, the seed is a pseudorandom permutation π: $\{0,1\}^k \to \{0,1\}^k$, and the stochastic code maps $m' \in \{0,1\}^{k-\ell}$ to $C(\pi(m'\|r))$ for uniformly random $r \leftarrow \{0,1\}^\ell$, where $\ell$ satisfies $\omega(k) \leq \ell \leq o(k)$.

2. Derandomize these codes by generating randomness deterministically as a hash of the message.

We will consider the following parameterized construction of a seeded code family.

Construction 4.1 Suppose that $C=\{C_k: \{0,1\}^k \to [q_k]^{n_k}\}_{k \in \mathbb{Z}^+}$ is a fully explicit ensemble of codes, $\Pi=\{\Pi_k \subseteq S_{\{0,1\}^k}\}_{k \in \mathbb{Z}^+}$ is a fully explicit ensemble of permutation families, and $H=\{H_k\}$ is a fully explicit ensemble of hash function families, where functions in $H_k$ map $\{0,1\}^{k-\ell_k}$ to $\{0,1\}^{\ell}$ for some $\ell = \ell_k$ satisfying $\omega(\log k) \le \ell_k \le o(k)$.

Then we define a seeded family of codes $\mathcal{SC}$ [C, $\Pi$, H] by the following algorithms (Setup, Enc):

Setup takes $1^k$ as input, samples $\pi \leftarrow \Pi_k$ and $h \leftarrow H_k$, and outputs $(\pi, h)$.

Enc takes $(\pi, h)$ as input, as well as a message $m \in \{0,1\}^{k-\ell}$, and outputs $C_k(\pi(m, h(m)))$.

$\mathcal{SC}$ [C, $\Pi$, H] inherits several basic properties from C, including alphabet size and block length. We only consider hash family ensembles ($H_k$) in which the output length $\ell_k$ of functions in $H_k$ satisfies $\ell_k \le o(k)$. With such parameters, the resulting coding scheme $\mathcal{SC}$ [C, $\Pi$, H] has the same rate as C.

4.2 From Efficient List Decodability to Pseudounique Decodability

We next observe that if C is Efficiently $\rho$-list decodable then so is C'=$\mathcal{SC}$ [C, $\Pi$, H] (as long as $\Pi$ and H are fully explicit). We show that this, combined with the high pseudodistance that we have already established, implies that C' has a pseudounique decoding algorithm against a large fraction of errors.

We first define the straight-forward adaptation of list decoding for seeded families of codes.

Definition 4.4 We say that Dec is an (L(·), $\rho$)-list decoding algorithm for a seeded family of codes (Setup, Enc) if for all pp in the support of Setup($1^k$), all $m \in \{0,1\}^k$, and all $y \approx_\rho$ Enc(pp, m), Dec(pp, y) is an L(k)-sized set that contains m. We say that Dec is simply a $\rho$-list decoding algorithm if it is an (L(·), $\rho$)-list decoding algorithm for some L(k)$\le k^{O(1)}$.

We say that C=(Setup, Enc) is efficiently $\rho$-list decodable if there exists a polynomial-time $\rho$-list decoding algorithm for C.

Proposition 4.5 If C=$\{C_k\}$ is efficiently $\rho$-list decodable and $\Pi$ and H are fully explicit, then so is $\mathcal{SC}$ [C, $\Pi$, H].

Proof. Given public parameters $(\pi,h) \leftarrow$ Setup($1^k$) and a noisy codeword c', we can list-decode by:
1. Running the list-decoding algorithm for $C_k$ to obtain strings $y_1, \ldots, y_L \in \{0,1\}^k$,
2. Inverting each $y_i$ under $\pi$ to obtain pairs $(m_1, r_1), \ldots, (m_L, r_L)$,
3. Outputting the set $\{m_i : r_i = h(m_i) \wedge C_k(\pi(m_i, r_i)) \approx_\rho c'\}$.

Proposition 4.6 If C=(Setup, Enc) is a seeded family of codes that:
is efficiently list-decodable against a $\rho$ fraction of errors; and
has relative pseudodistance $\tilde{\delta}$,
then C is efficiently pseudouniquely decodable against a $\rho'$ fraction of errors for any $$\rho' < \min\left(\rho, \frac{\tilde{\delta}}{2}\right).$$

Proof. Let q=q(k) and n=n(k) denote the alphabet and block length of C, respectively. The efficient pseudounique decoding algorithm Dec operates as follows, given public parameters pp and corrupted codeword $y \in [q]^n$ as input:
1. Run the list-decoding algorithm for C on (pp, y) to obtain a list of messages $m_1, \ldots, m_L$ (and corresponding codewords $c_1, \ldots, c_L$).
2. Output $m_i$ for the $i \in =[L]$ minimizing $\Delta(c_i, y)$.

This algorithm clearly runs in polynomial-time, so it suffices to analyze correctness. Suppose we have (m, y)$\leftarrow$A (pp), where A is a polynomial-size adversary and $\Delta(y,$ Enc(pp, m))$\le \rho'$n. We first observe that some $m_i$=m by the list-decodability of C. No other $m_j$ can also have $\Delta(y,$ Enc(pp, m))$\le \rho'$n, because otherwise we would have $\Delta(m_i, m_j) \le 2\rho'$n$<\tilde{\delta}$n by the triangle inequality. This contradicts the C's pseudodistance since the above process for generating $\{m_1, \ldots, m_L\}$ is efficient.

In other words, $c_i$ is the closest codeword to y, and the decoding algorithm outputs $m_i$=m as desired.

Main Theorem

Theorem 4.7 For any:
rate-r (efficiently) $\rho$-list decodable fully explicit ensemble C of codes $\{C_k: \{0,1\}^k \to [q_k]^{n_k}\}_{k \in \mathbb{Z}^+}$;
ensemble $\Pi=\{\Pi_k \subseteq S_{\{0,1\}^k}\}_{k \in \mathbb{Z}^+}$ of $\omega(1)$-wise O(1)-dependent (in Rényi $\infty$-divergence) permutation families;
ensemble $H=\{H_k\}$ of 2-input correlation intractable hash families, where functions in $H_k$ map $\{0,1\}^k$ to $\{0,1\}^{k-\ell_k}$ for $\omega(\log k) \le \ell_k \le o(k)$;

$$\rho' < \min\left(\rho, \frac{H_q^{-1}(r + H_q(\rho))}{2}\right)$$

where $q=\lim_{k \to \infty} q_k$, $\mathcal{SC}$ [C, $\Pi$, H] is efficiently pseudouniquely decodable against a $\rho'$ fraction of errors.

Instantiations with Known Codes

We apply Theorem 4.7 with some known codes, first recalling applicable results from coding theory. We focus on large alphabets ($q_k \to \infty$) and binary alphabets ($q_k=2$).

Imported Theorem 4.8 For all r, $\rho \in (0,1)$ satisfying r+$\rho$<1, there is a rate-r, efficiently $\rho$-list decodable, fully explicit ensemble of codes $\{C_k: \{0,1\}^k \to [q_k]^{n_k}\}_{k \in \mathbb{Z}^+}$ with $q_k \le$ poly (k).

Imported Theorem 4.9 For all r, $\rho$ satisfying $0 < \rho < \frac{1}{2}$ and $$0 < r < R_{BZ}(\rho) \stackrel{\text{def}}{=} 1 - H(\rho) - \rho \cdot \int_0^{1-H(\rho)} \frac{dx}{H^{-1}(1-x)},$$

there is a rate-r, efficiently $\rho$-list decodable, fully explicit ensemble of codes $\{C_k: \{0,1\}^k \to \{0,1\}^{n_k}\}_{k \in \mathbb{Z}^+}$.

Plugging these codes into Theorem 4.7, we get

Corollary 4.10 For all r, $\rho$ with r+$\rho$<1, there is a rate-r seeded family of codes (with alphabet size $q_k \le$ poly(k)), that is efficiently pseudouniquely decodable against a $\rho$ fraction of errors.

This result should be contrasted with the Singleton bound, which states that if rate-r code is uniquely decodable against a $\rho$ fraction of errors, then r+2$\rho \le 1$.

Corollary 4.11 For all $0 < \rho < \frac{1}{2}$ and all $0 < r < R_{BZ}(\rho)$, there is a rate-r seeded family of binary codes that is efficiently pseudouniquely decodable against a $$\min\left(\rho, \frac{H^{-1}(r+H(\rho))}{2}\right)$$

fraction of errors.

Hardware Overview

With reference to FIG. 1, an example algorithm for securing an input message against noise in a channel is illustrated. The encoding algorithm 105 receives message 106 and processes it as described herein to generate an encoded message 107. The encoded message 107 may then be transmitted over a channel or stored in a media or other form of memory.

The channel or media may be subjected to one or more forms of noise 115. The noise could be any form of changes to the encoded message, such as but not limited to an unwanted disturbance in an electrical signal carrying the encoded message from an information source to an information destination. In some cases, the noise could be a corruption of data stored at rest in the media, due to a failure of the media device or an environmental impact, such as radiation. As non-limiting examples, the transmitted signal could be corrupted in a random manner by a variety of possible mechanisms, such as additive thermal noise generated by electronic devices; man-made noise, e.g., automobile ignition noise; and atmospheric noise, e.g., electrical lightning discharges during thunderstorms. Other channel impairments including noise, attenuation, distortion, fading, and interference (such as interference from other users of the channel) are all considered to be noise within the scope of the disclosure.

The decoding algorithm receives the potentially corrupted message 108 and processes it as described herein to generate a decoded message 110 by use of decoding algorithm 109.

Figure 2:
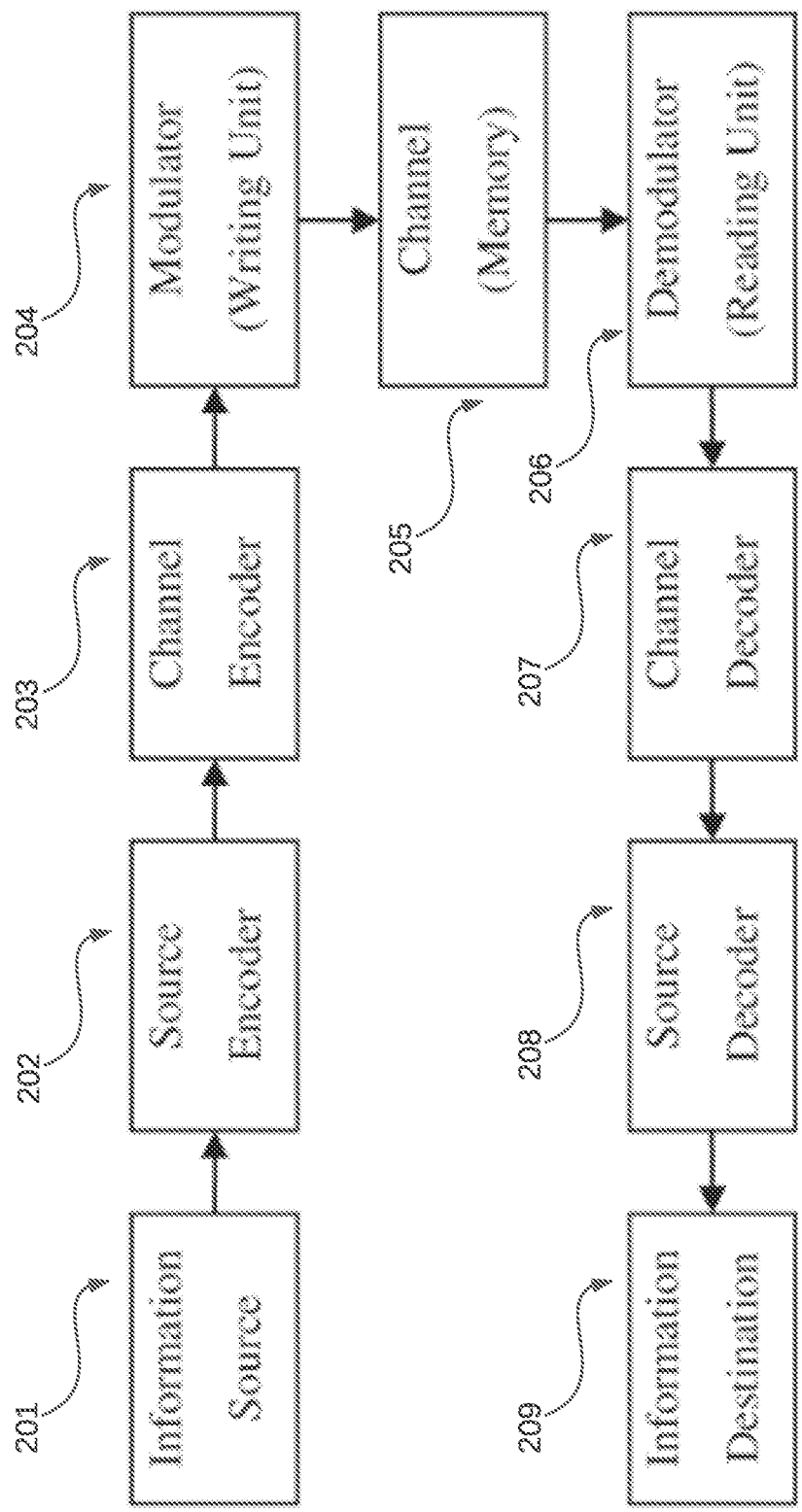
FIG. 2 illustrates an example system for encoding and decoding against noise in a channel.

FIG. 2 illustrates a system for securing an input message against noise in a channel. Source Information 201 can be any form of information capable of being represented and ultimately processed by a computerized processing unit. As non-limiting examples, Source Information 201 could be human-readable, such as text, or computer executable instructions, or other forms of data. The Source Information 201 may be an analog signal, such as an audio or video signal, or a digital signal, such as the output of a computer that is discrete in time and has a finite number of output characters. That information may be pre-processed by a Source Encoder 202. Source Encoder 202 may, for example, store the information in a predetermined format, or possibly encrypt the information. The messages produced by the source are converted into a sequence of bits. By Source Encoder 203, the message may be compressed. In Channel Encoding 203, the encoding methods described herein to generate an encoding against noise may be applied as described above. The binary sequence at the output of the Channel Encoder 203 is passed to the digital Modulator 204, which serves as the interface to the physical, in some cases analog, Channel 205 or Memory 205.

The Channel 205 may be the physical medium that is used to send the signal from the transmitter to the receiver. As non-limiting examples, the Channel 205 may be a pair of wires that carry the electrical signal, an optical fiber that carries the information on a modulated light beam, or an underwater ocean channel in which the information is transmitted acoustically, or free space over which the information-bearing signal is radiated by use of an antenna. Other media that can be characterized as Communication 205 according to this disclosure are any form of fixed data storage media, including as non-limiting examples, magnetic tape, magnetic disks, and optical disks.

At the receiving end of a digital communication system, the Demodulator 206 processes the potentially channel-corrupted transmitted waveform and reduces the waveforms to a sequence of numbers that represent estimates of the transmitted data symbols (binary or M-ary). This sequence of numbers is passed to the Channel Decoder 207, which attempts to reconstruct the original information sequence based on the decoding methods disclosed herein. As a final step, when an analog output is desired, the Source Decoder 208 accepts the output sequence from the Channel Decoder 207 and, from knowledge of the source encoding method used, attempts to reconstruct the original signal from the source and return that as Destination Information 209.

Figure 3:
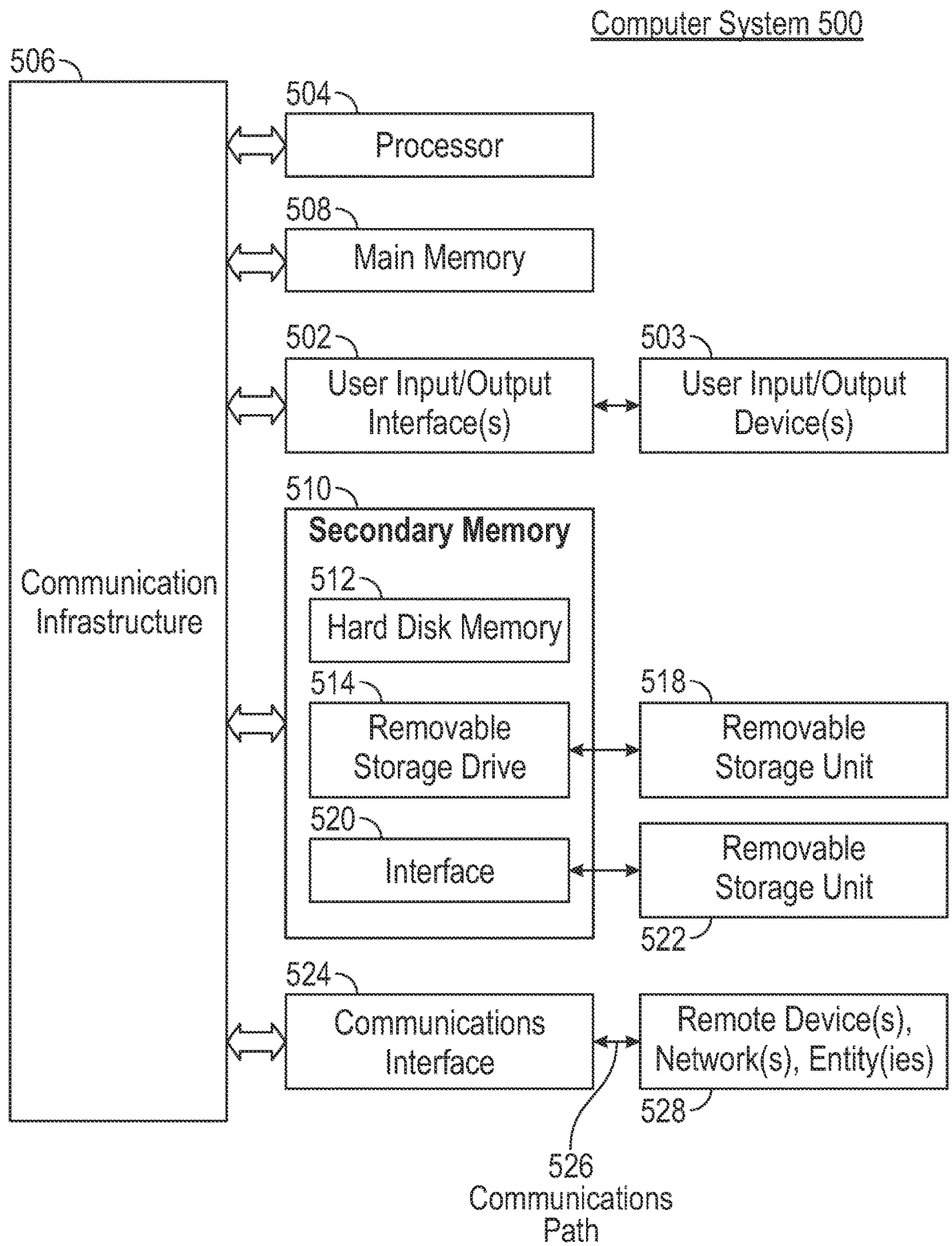
FIG. 3 illustrates an example computer system architecture for implementing the claimed systems and methods.
Figure 4:
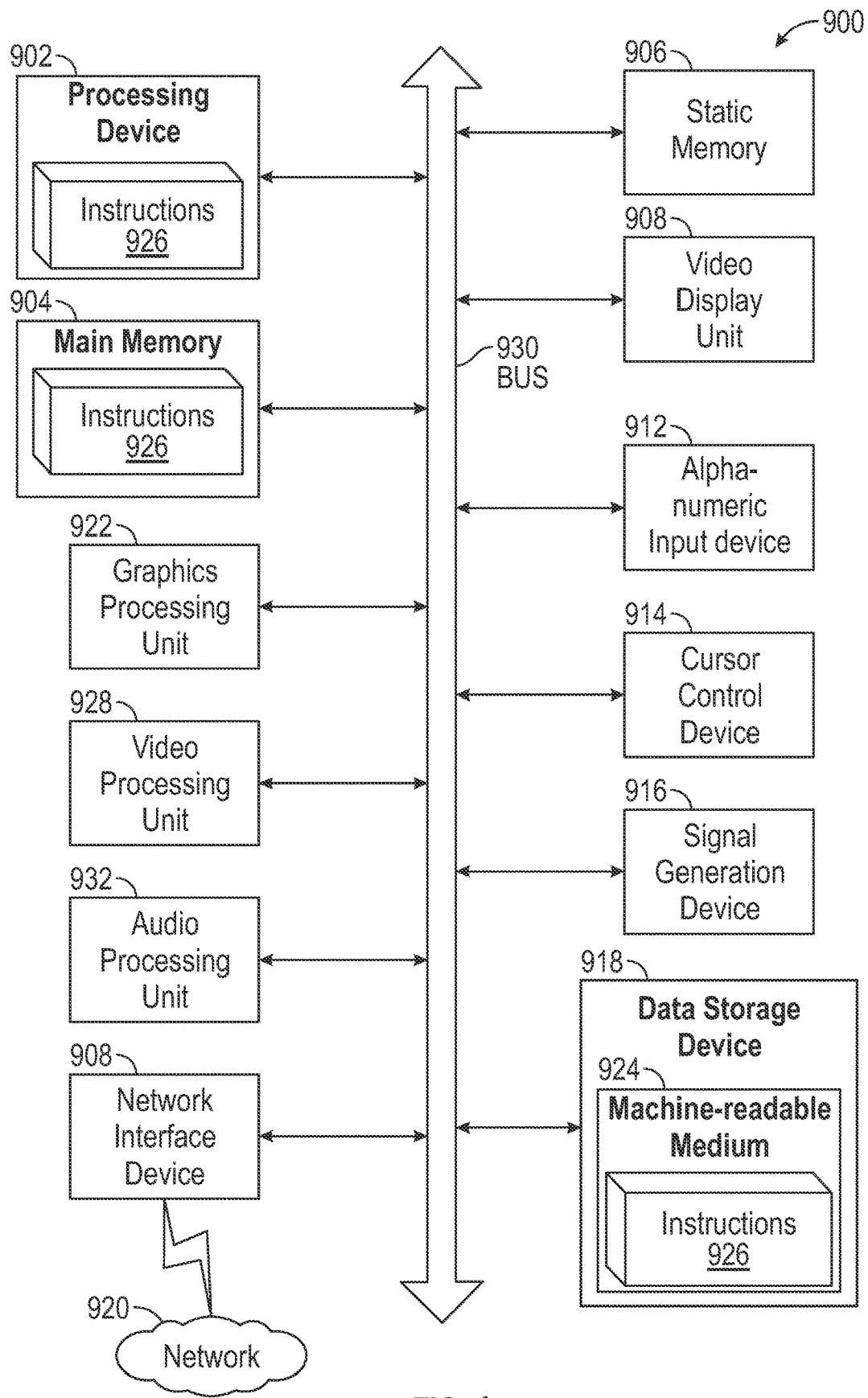
FIG. 4 illustrates further details of an example computer system architecture for implementing the claimed systems and methods.

FIGS. 3 and 4 depict example computer systems useful for implementing various embodiments described in the present disclosure. Various embodiments may be implemented, for example, using one or more computer systems, such as computer system 500 shown in FIG. 3. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity(ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (Paas), desktop as a service (DaaS), framework as a service (FaaS), backend as a service (Baas), mobile backend as a service (MBaaS), infrastructure as a service (IaaS), etc.); and/or a hybrid model including any combination of the foregoing examples or other services or delivery paradigms.

FIG. 4 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 3 and 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A computerized method for encoding messages with robustness against noise, the method comprising:
receiving an input message;
storing the input message in a computerized data store;
executing a compressing hash function on the input message to generate an output;
encoding the output of the hash function and the input message to generate a single combined message;
executing a permutation function on the combined message to generate a result;
encoding the result of the permutation function with a list-decodable code;
storing the encoded result in the computerized data store; and
transmitting the encoded result in a communication channel, wherein the communication channel is wired or wireless, and wherein the computerized data store is a solid-state drive or a hard drive.

2. The method of claim 1, wherein:
the compressing hash function is a cryptographic hash function with an output that is smaller in bit length than the input message; and
when the encoding function to generate a single combined message is applied separately to two uniformly random strings, each string of the same length as the combined message, the resulting outputs are far in Hamming distance from each other with high probability.

3. The method of claim 1, wherein the single combined message is a concatenation of the input message and the output of the compressing hash function.

4. The method of claim 1, wherein the permutation function has the properties of k-wise delta-dependence, where k is an integer selected based on its size and delta is a real number, and wherein the permutation function has an efficient inversion algorithm.

5. The method of claim 1, wherein the list-decodable code has the property of being efficiently p-list decodable, such that there exists an efficient algorithm that takes as input any noisy encoded message in which at most a p fraction of the symbols of the encoded message have been affected by noise, and outputs a list of possible messages that includes the input message, wherein p is a real number between 0 and 1.

6. The method of claim 1, further comprising:
reading the encoded result from the computerized data store; and
transmitting the encoded result in a wireless broadcast communication channel to a plurality of recipients.

7. A computerized method for decoding a codeword which may have been corrupted by noise, the method comprising:
receiving a potentially noisy encoding of an original message;
computing a list of strings by using a list-decoding algorithm applied to the potentially noisy encoding of the original message;
for each string in the list, applying a permutation function, resulting in a new list of permuted strings;
for each permuted string, parsing it as a pair comprising a message and a hash value, resulting in a list of message-hash value pairs;
from among the list of message-hash value pairs, selecting all pairs in which the hash value is equal to a result of applying a cryptographic hash function to the original message;
if there are no pairs in the selection, then output that the codeword had uncorrectable noise; and
if and only if there is at least one pair remaining, output the message component of the pair whose encoding is determined to be closest to the received potentially noisy encoding in Hamming distance.

8. The method of claim 7, wherein the permutation function is configured to be the inverse of a permutation function that has the properties of k-wise delta-dependence, where k is an integer selected based on its size and delta is a real number, and wherein the permutation function has an efficient inversion algorithm.

9. The method of claim 7, wherein the list-decoding algorithm is configured to enumerate a list of all possible message-hash value pairs whose encoding is p-close in relative Hamming distance to the received potentially noisy encoding, where p is a real number between 0 and 1.

10. A computerized system for encoding messages with robustness against noise, the system comprising:
a receiver module configured for receiving an input message;
a computerized data store configured for storing the input message;
a computerized processor configured for:
executing a compressing hash function on the input message to generate an output;
encoding the output of the hash function and the input message to generate a single combined message;
executing a permutation function on the combined message to generate a result; and
encoding the result of the permutation function with a list-decodable code.

11. The system of claim 10, wherein:
the compressing hash function is a cryptographic hash function with an output that is smaller in bit length than the input message; and
when the encoding function to generate a single combined message is applied separately to two uniformly random strings, each string of the same length as the combined message, the resulting outputs are far in Hamming distance from each other with high probability.

12. The system of claim 10, wherein the single combined message is a concatenation of the input message and the output of the compressing hash function.

13. The system of claim 10, wherein the permutation function has the properties of k-wise delta-dependence, where k is an integer selected based on its size and delta is a real number, and wherein the permutation function has an efficient inversion algorithm.

14. The system of claim 10, wherein the list-decodable code has the property of being efficiently p-list decodable, such that there exists an efficient algorithm that takes as input any noisy encoded message in which at most a p fraction of the symbols of the encoded message have been affected by noise, and outputs a list of possible messages that includes the input message, wherein p is a real number between 0 and 1.

15. The system of claim 10, further comprising a transmitter configured for transmitting the encoded result in a communication channel, wherein the communication channel is wired or wireless, and wherein the computerized data store is a solid-state drive or a hard drive.

16. The system of claim 10, wherein the computerized processor is further configured for:
reading the encoded result from the computerized data store; and transmitting the encoded result in a wireless broadcast communication channel to a plurality of recipients.

17. A computerized system for decoding a codeword which may have been corrupted by noise, the system comprising:
a computerized processor configured for:
receiving a potentially noisy encoding of an original message;
computing a list of strings by using a list-decoding algorithm applied to the potentially noisy encoding of the original message;
for each string in the list, applying a permutation function, resulting in a new list of permuted strings;
for each permuted string, parsing it as a pair comprising a message and a hash value, resulting in a list of message-hash value pairs;
from among the list of message-hash value pairs, selecting all pairs in which the hash value is equal to a result of applying a cryptographic hash function to the original message;
if there are no pairs in the selection, then output that the codeword had uncorrectable noise; and
if and only if there is at least one pair remaining, output a message component of the pair whose encoding is determined to be closest to the received potentially noisy encoding in Hamming distance; and
a computerized data store configured for storing the message component.

18. The system of claim 17, wherein the permutation function is configured to be the inverse of a permutation function that has the properties of k-wise delta-dependence, where k is an integer selected based on its size and delta is a real number, and wherein the permutation function has an efficient inversion algorithm.

19. The system of claim 17, wherein the list-decoding algorithm is configured to enumerate a list of all possible message-hash value pairs whose encoding is p-close in relative Hamming distance to the received potentially noisy encoding, where p is a real number between 0 and 1.

* * * * *